United States Patent
Lai et al.

(10) Patent No.: US 12,124,307 B2
(45) Date of Patent: Oct. 22, 2024

(54) MEDIA STREAMING DEVICE AND MEDIA STREAMING METHOD

(71) Applicant: Realtek Semiconductor Corporation, Hsinchu (TW)

(72) Inventors: Chao-Min Lai, Hsinchu (TW); Chia-Chi Yeh, Hsinchu (TW); Chieh-Lung Hsieh, Hsinchu (TW); Chih-Feng Lin, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 113 days.

(21) Appl. No.: 17/821,795

(22) Filed: Aug. 23, 2022

(65) Prior Publication Data

US 2023/0216904 A1 Jul. 6, 2023

(30) Foreign Application Priority Data

Dec. 30, 2021 (TW) ................................ 110149608

(51) Int. Cl.
*G06F 1/28* (2006.01)
*G06F 1/30* (2006.01)
*G06F 1/324* (2019.01)

(52) U.S. Cl.
CPC ................ *G06F 1/28* (2013.01); *G06F 1/305* (2013.01); *G06F 1/324* (2013.01)

(58) Field of Classification Search
CPC ............... G06F 1/28; G06F 1/32; G06F 1/324
See application file for complete search history.

(56) References Cited

U.S. PATENT DOCUMENTS

| 6,020,723 A * | 2/2000 | Desor .................... H03K 17/80 |
| | | 372/37 |
| 11,057,675 B2 | 7/2021 | Lai et al. |
| 2011/0040901 A1 | 2/2011 | Khan et al. |
| 2014/0327833 A1 | 11/2014 | Kabuto |
| 2016/0173939 A1 | 6/2016 | Iwami et al. |
| 2020/0192854 A1* | 6/2020 | Bristow .................... H02J 1/10 |
| 2020/0195128 A1* | 6/2020 | Maruyama ............ H02M 7/217 |
| 2021/0286420 A1 | 9/2021 | Garner et al. |

FOREIGN PATENT DOCUMENTS

TW I664786 B 7/2019

* cited by examiner

*Primary Examiner* — Mark A Connolly
(74) *Attorney, Agent, or Firm* — CKC & Partners Co., LLC

(57) ABSTRACT

A media streaming device includes a power manager, a stream processor, and a voltage detector. The power manager receives a power signal from the media playback device to supply power to the stream processor. The stream processor provides media stream to the media playback device for playback. The voltage detector is electrically coupled to the stream processor and captures at least a part of the power supply current to the stream processor. The stream processor is configured to determine whether the power supply voltage remains stable. When the supply voltage remains stable, the stream processor operates in a first mode to provide media stream. When the power supply voltage is unstable, the stream processor operates in a second mode to provide media stream, and the power consumption of the stream processor in the second mode is lower than the power consumption in the first mode.

9 Claims, 2 Drawing Sheets

MEDIA STREAMING DEVICE AND MEDIA STREAMING METHOD

CROSS-REFERENCE TO RELATED APPLICATION

This application claims priority to Taiwan Application Serial Number 110149608, filed Dec. 30, 2021, which is herein incorporated by reference in its entirety.

BACKGROUND

Technical Field

The present disclosure relates to a technology of media streaming, especially a media streaming device coupled to a media playback device to provide a media stream and a media streaming method.

Description of Related Art

In recent years, with the vigorous development of network streaming, various "media streaming devices" such as over-the-top set-top box (OTT STB) or TV stick have become the mainstream products of home audio and video equipment. With network streaming, users can watch a variety of programs over the Internet. For the convenience of use, users often directly couple the media streaming device to the TV, so that the TV can directly supply power and drive the media streaming device. However, when the media streaming device is operating, the internal components may have instantaneous high power consumption requirements, and a high-current power supply is required, otherwise the media streaming device will appear abnormal or wrong. Therefore, how to design a new media streaming device and media streaming method is an important issue in the industry.

SUMMARY

One aspect of the present disclosure is a media streaming device, comprising a power manager, a stream processor and a voltage detector. The power manager is configured to receive a power signal from a media playback device. The power signal comprises a supply current and a supply voltage. The stream processor is electrically connected to the power manager to receive the power signal, and is configured to provide a media stream to the media playback device for playback. The voltage detector is electrically connected to the stream processor, and is configured to capture at least one part of the supply current to generate a detection signal to the stream processor. The stream processor is configured to determine whether the supply voltage remains stable, when the supply voltage remains stable, the stream processor operates in a first mode to provide the media stream. When the supply voltage is unstable, the stream processor operates in a second mode to provide the media stream, and a first power consumption of the stream processor in the first mode is larger than a second power consumption of the stream processor in the second mode.

Another aspect of the present disclosure is a media streaming method, comprising: receiving, by a power manager of a media streaming device, a power signal from a media playback device, wherein the power signal comprises a supply current and a supply voltage; driving a stream processor of the media streaming device according to the power signal; determining, by a voltage detector of the media streaming device, whether the supply voltage remains stable when the stream processor is activated. When the supply voltage remains stable, controlling the stream processor to operate in a first mode to provide the media stream; and when the supply voltage is unstable, controlling the stream processor to operate in a second mode to provide the media stream, wherein a first power consumption of the stream processor in the first mode is larger than a second power consumption of the stream processor in the second mode.

Another aspect of the present disclosure is a media streaming device, comprising a power manager, a stream processor and a voltage detector. The power manager is configured to receive a power signal from a media playback device. The power signal comprises a supply voltage. The stream processor is electrically connected to the power manager to receive the power signal, and is configured to provide a media stream to the media playback device for playback. The voltage detector is electrically connected to the stream processor, and is configured to detect the supply voltage received by the power manager. The stream processor is configured to determine whether the supply voltage remains stable, when the supply voltage remains stable, the stream processor operates in a first mode to provide the media stream. When the supply voltage is unstable, the stream processor operates in a second mode to provide the media stream, and a first power consumption of the stream processor in the first mode is larger than a second power consumption of the stream processor in the second mode.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
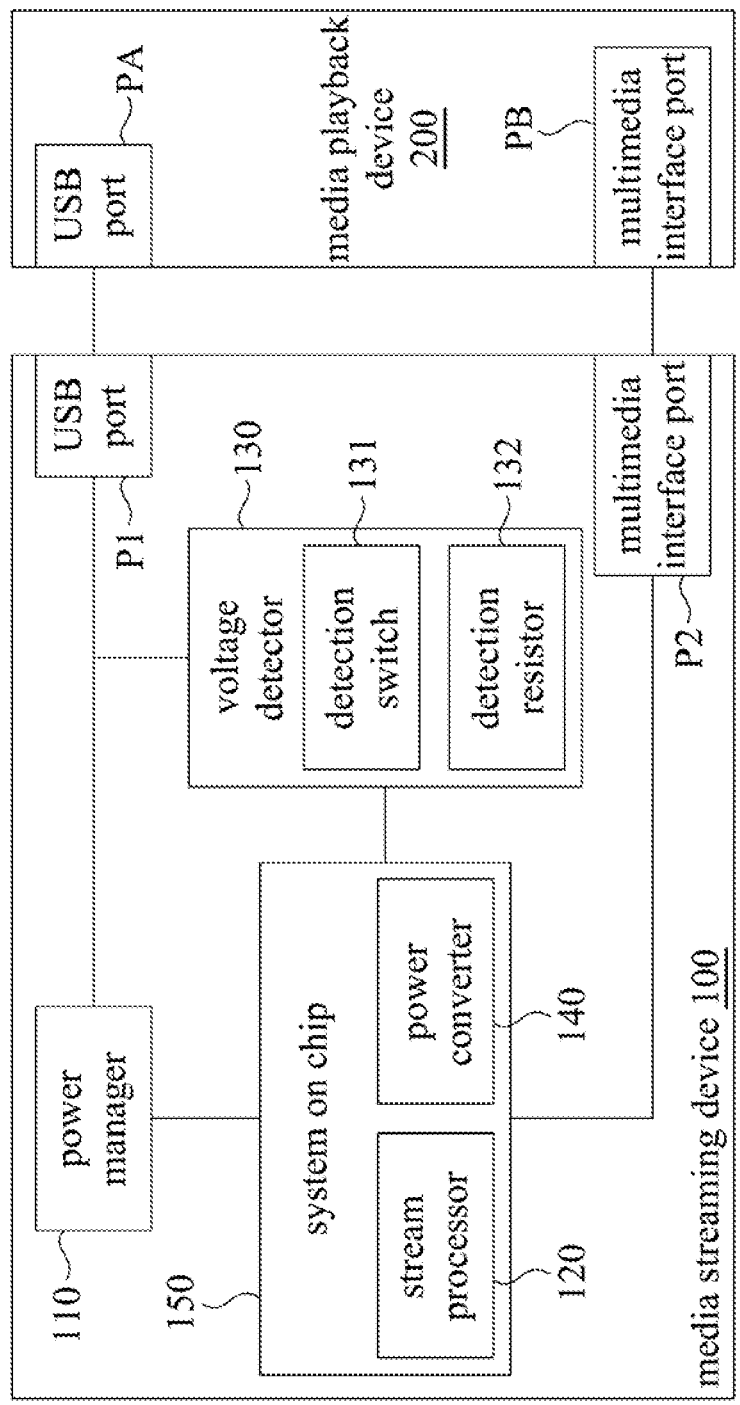
FIG. 1 is a schematic diagram of a media streaming device in some embodiments of the present disclosure.

FIG. 1 is a schematic diagram of a media streaming device in some embodiments of the present disclosure. The media streaming device 100 is electrically connected to a media playback device 200, and is configured to provide a media stream to the media playback device 200. The media streaming device 100 may be implemented to an over-the-top set-top box (OTT STB) or a TV stick. The media playback device 200 may be implemented to a TV or a screen.

The media streaming device 100 includes a power manager 110, a stream processor 120 and a voltage detector 130. The power manager 110 is configured to receive a power signal from the media playback device 200, so as to supply power to the stream processor 120. In some embodiments, the media streaming device 100 and the media playback device 200 respectively includes a Universal Serial Bus port (i.e., the USB ports P1, PA). The power manager 110 is electrically connected to the USB ports P1, PA to receive the power signal. The power signal includes a supply current and a supply voltage.

The stream processor 120 is electrically connected to the power manager 110 and the media playback device 200, and is configured to receive the power signal and is driven, so as to provide the media stream to the media playback device 200 for playback. The stream processor 120 may be implemented to a processing unit, a graphics processing unit, and a network communication unit that can access the Internet, such as a WiFi communication unit (not shown in figure). The stream processor 120 is configured to connect with a remote server to access a media data including video and audio in the remote server. After processing the media data, the stream processor 120 provides the media data to the media playback device 200 in the form of the media stream for playback.

In some embodiments, the media streaming device 100 and the media playback device 200 respectively includes corresponding multimedia ports P2, PB. The multimedia ports can be HDMI (High Definition Multimedia Interface) interface. The stream processor 120 is electrically connected to the media playback device 200 though multimedia ports P2, PB, so as to provide the media stream. In other words, after the media streaming device 100 coupled to the media playback device 200, the media streaming device 100 obtains the power signal and provides the media stream at the same time, without the need to connect an additional power supply through an additional power cable.

The voltage detector 130 is electrically connected to the stream processor 120 and the USB port P1 (or the power manager 110), and is configured to capture at least one part of the supply current. The above "capture" means when the voltage detector 130 is driven, at least "captured current flow" from the media playback device 200 received by the media streaming device 100. For example, if the original current provided by the media playback device 200 to the power manager 110 through the USB port P1 is 0.8 A (amps), and the default current captured by the voltage detector 130 is 1 A, after the voltage detector 130 is driven, the media playback device 200 will supply a current of 1 A to the media streaming device 100 through the USB port P1 (the operation of the voltage detector 130 will be described in the following paragraphs.)

According to the detection result, the voltage detector 130 generates a detection signal (e.g., current value or voltage value) to the stream processor 120, so that the stream processor 120 determines whether the supply voltage is stable, and selectively operates in the different modes. For example, when the supply voltage remains stable, the stream processor 120 operates in the first mode to provide the media stream. When the supply voltage is unstable, the stream processor 120 change to operate in the second mode to provide the media stream. The first power consumption of the stream processor 120 in the first mode is larger than the second power consumption of the stream processor 120 in the second mode.

The magnitude of the current captured/obtained by the voltage detector 130 can be set arbitrarily, such as 0.5 A, 1 A. In some embodiments, the amount of current captured/obtained varies with time. For example, the voltage detector 130 can capture 0.5 A first, and if the supply voltage is stable, then the voltage detector 130 adjusts to capture 1 A of current.

Taking the media playback device 200 is TV as an example, the USB port configured on some TVs is USB2.0, the supply voltage of TV is 5 volts, and the supply current is 0.5 A. However, while the media streaming device 100 is operating, the media streaming device 100 may still require higher current or voltage at some point. By detecting the power supply capability of the media playback device 200, the media streaming device 100 can be dynamically operated in different modes to ensure that the media stream can be provided to the media playback device 200 normally, and can avoid the media streaming device 100 operating unstable, errors or even damage and other problems.

The above "first mode" may be a normal operating state of the stream processor 120, and the above "second mode" may be a state in which the stream processor 120 operates with low power consumption. In other words, when the stream processor 120 operates in the second mode, the function or performance performed by the stream processor 120 will be relatively low. The stream processor 120 can provide the media stream to the media playback device 200 in two modes, the difference between two modes is that the quality of the media stream is different (e.g., lower resolution, or reduced signal transmission bandwidth).

As mentioned above, in one embodiment, when the stream processor 120 operates in the first mode, the stream processor 120 provides the media stream at a first resolution. When the stream processor 120 operates in the second mode, the stream processor 120 provides the media stream at a second resolution. The first resolution is larger than the second resolution.

In one embodiment, when the stream processor 120 operates in the first mode, the stream processor 120 has a first clock speed. When the stream processor 120 operates in the second mode, the stream processor 120 has a second clock speed. The first clock speed is larger than the second clock speed.

In one embodiment, when the stream processor 120 operates in the first mode, the stream processor 120 generates the media stream according to High Dynamic Range imaging (HDR).

In some other embodiments, when the stream processor 120 operates in the first mode, the stream processor 120 is configured to drive multiple antennas (not shown in figure) of the media streaming device 100 to receive media data from a remote server. When the stream processor 120 operates in the second mode, the stream processor 120 only drives a part of the antennas, and closes the rest of the antennas to receive media data to reduce power consumption.

The following describes how the stream processor 120 determines whether the supply voltage is stable through the voltage detector 130. As shown in FIG. 1, in some embodiments, the voltage detector 130 includes a detection switch 131 and a detection resistor 132. The detection switch 131 can be a power switch, which is connected in series with the detection resistor 132. The stream processor 120 is configured to turn on the detection switch 131 so that the voltage detector 130 forms a current path to capture at least one part of the supply current. The magnitude of the captured current will depend on the size of the detection resistor 132. In some embodiments, the detection resistor 132 can also be a variable resistor. The stream processor 120 can determine whether the supply voltage in the power signal remains stable when the voltage detector 130 is turned on. For example, the stream processor 120 may determine whether the supply voltage remains above a voltage threshold (e.g., 5 volts) during a detection period, so as to confirm that the supply voltage is stable.

As mentioned above, in some embodiments, when the power signal has just been activated (i.e., when the media streaming device 100 is just connected to the media playback device 200), the stream processor 120 turns on the detection switch 131 to determine whether the supply voltage remains stable through the voltage detector 130. The stream processor 120 performs determining according to the detection signal transmitted by the voltage detector 130. The detection signal can be the supply current, the voltage signal of the voltage detector 130, or the voltage signal received by the power manager 110.

In some other embodiments, the voltage detector 130 may also do not capture the supply current, and directly detects the change of the supply voltage. The voltage detector 130 is electrically connected to a node of the power manager 110 configured to receive the power signal, so as to continuously or periodically detect the supply voltage received by the power manager 110. During each detection, the stream processor 120 receives the voltage signal from the voltage detector 130 to determine whether the supply voltage remains above a voltage threshold during a detection period (e.g., 5 volts). If the supply voltage remains above the voltage threshold during the detection period, it means the supply voltage is stable. If the supply voltage does not remain above the voltage threshold during the detection period, it means that the supply voltage is unstable.

Figure 2:
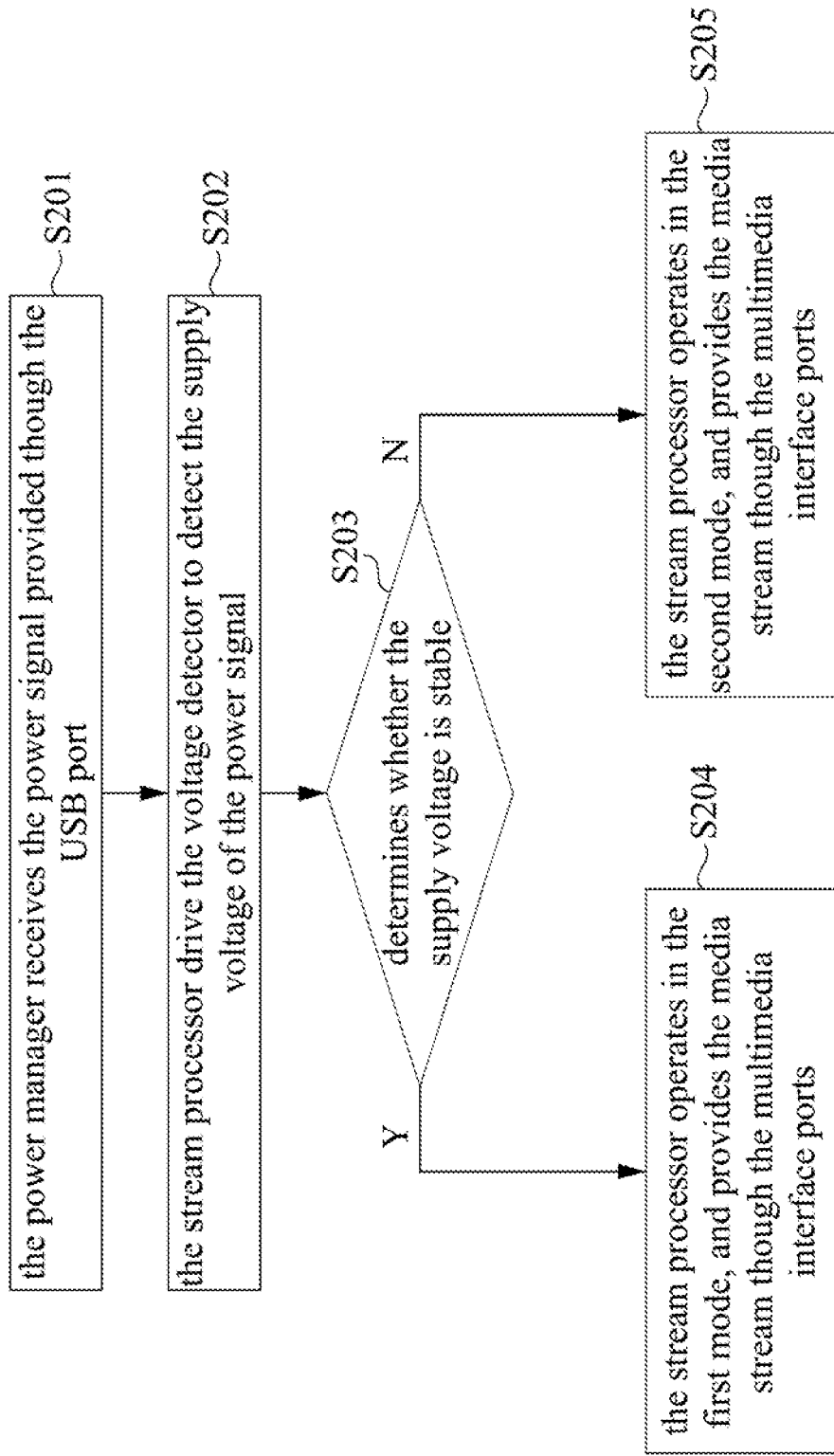
FIG. 2 is a flowchart illustrating a media streaming method in some embodiments of the present disclosure.

FIG. 2 is a flowchart illustrating a media streaming method in some embodiments of the present disclosure. In step S201, the media streaming device 100 is coupled to the media playback device 200. At this time, the power manager 110 receives the power signal provided by the media playback device 200 though the USB ports P1, PA.

In step S202, when the stream processor 120 of the media streaming device 100 is activated according to the power signal, the stream processor 120 drive the voltage detector 130 to detect the supply voltage of the power signal. At the same time, the stream processor 120 can receive media through the internal wireless transmission module. In step S203, the stream processor 120 determines whether the supply voltage is stable. For example, to determine whether the supply voltage remains above the voltage threshold (e.g., 5 volts) during a detection period, or to determine whether the change range of the supply voltage exceeds the preset range during a detection period.

As mentioned above, in one embodiment, the stream processor 120 may turn on the detection switch 131, so that the voltage detector 130 extract at least a part of the supply current (e.g., 0.5A, 1A), and determine whether the supply voltage of the power signal is unstable under this condition. In other embodiments, the voltage detector 130 continuously or periodically monitors/detects the supply voltage received by the power manager 110, so that the stream processor 120 can determine whether the supply voltage remains stable.

If the supply voltage is stably remains above the voltage threshold, in step S204, the stream processor 120 operates in the first mode, and provides the media stream though the multimedia interface ports P2, PB. If the supply voltage is not stably remains above the voltage threshold, in step S205, the stream processor 120 changes to operate in the second mode, and provides the media stream though the multimedia interface ports P2, PB. The second power consumption of the stream processor in the second mode is less than the first power consumption of the stream processor in the first mode.

In addition, as shown in FIG. 1, in some embodiments, the media streaming device 100 further includes a power converter 140. The power converter 140 is electrically connected between the power manager 110 and the stream processor 120, and is configured to convert the power signal to have a power supply specification that meets to the stream processor 120. In some embodiments, the power converter 140 and the stream processor 120 may be arranged in a same system on chip 150.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A media streaming device, comprising:
a power manager configured to receive a power signal from a media playback device, wherein the power signal comprises a supply current and a supply voltage;
a stream processor electrically connected to the power manager to receive the power signal, and configured to provide a media stream to the media playback device for playback; and
a voltage detector electrically connected to the stream processor, and comprising a detection switch and a detection resistor, wherein the detection switch is connected in series with the detection resistor;
wherein the stream processor is configured to turn on the detection switch so that the voltage detector forms a current path to capture at least one part of the supply current and generate a detection signal to the stream processor according to the detection resistor;
wherein the stream processor is configured to determine whether the supply voltage remains stable, when the supply voltage remains stable, the stream processor operates in a first mode to provide the media stream; and when the supply voltage is unstable, the stream processor operates in a second mode to provide the media stream, and a first power consumption of the stream processor in the first mode is larger than a second power consumption of the stream processor in the second mode.

2. The media streaming device of claim 1, wherein when the stream processor is activated according to the power signal, the stream processor turns on the detection switch, and the voltage detector determines whether the supply voltage remains above a voltage threshold during a detection period according to the detection signal.

3. The media streaming device of claim 1, further comprising a Universal Serial Bus port and a multimedia interface port, wherein the power manager is electrically connected to the Universal Serial Bus port to receive the power signal, and the stream processor is electrically connected to the multimedia interface port to provide the media stream to the media playback device for playback.

4. The media streaming device of claim 1, wherein when the stream processor operates in the first mode, the stream processor provides the media stream at a first resolution, when the stream processor operates in the second mode, the stream processor provides the media stream at a second resolution, and the first resolution is larger than the second resolution.

5. The media streaming device of claim 1, wherein when the stream processor has a first clock speed when operating in the first mode, when the stream processor has a second clock speed when operating in the second mode, and the first clock speed is larger than the second clock speed.

6. The media streaming device of claim 1, wherein when the stream processor operates in the first mode, the stream processor generates the media stream according to High Dynamic Range imaging.

7. A media streaming method, comprising:
receiving, by a power manager of a media streaming device, a power signal from a media playback device, wherein the power signal comprises a supply current and a supply voltage;
driving a stream processor of the media streaming device according to the power signal;
turning on a detection switch, by a voltage detector, to form a current path to capture at least one part of the supply current according to a detection resistor of the voltage detector when the stream processor is activated and generate a detection signal to the stream processor, wherein the detection switch is connected in series with the detection resistor;
determining, by the stream processor, whether the supply voltage remains stable;
when the supply voltage remains stable, controlling the stream processor to operate in a first mode to provide a media stream; and
when the supply voltage is unstable, controlling the stream processor to operate in a second mode to provide the media stream, wherein a first power consumption of the stream processor in the first mode is larger than a second power consumption of the stream processor in the second mode.

8. The media streaming method of claim 7, wherein determining whether the supply voltage remains stable comprises:
determining whether the supply voltage remains above a voltage threshold during a detection period according to the detection signal.

9. The media streaming method of claim 7, wherein controlling the stream processor to provide the media stream comprises:
receiving, by a Universal Serial Bus port of the media streaming device, the power signal to driving the stream processor; and
providing, by a multimedia interface port of the media streaming device, the media stream to the media playback device.

* * * * *